United States Patent
Conzelmann et al.

[11] Patent Number: 5,144,219
[45] Date of Patent: Sep. 1, 1992

[54] VOLTAGE-REGULATOR FOR GENERATOR

[75] Inventors: Gerhard Conzelmann, Leinfelden-Oberaichen; Walter Kohl, Bietigheim; Karl Nagel, Gomaringen, all of Fed. Rep. of Germany

[73] Assignee: Robert Bosch GmbH, Stuttgart, Fed. Rep. of Germany

[21] Appl. No.: 602,291

[22] PCT Filed: Mar. 23, 1990

[86] PCT No.: PCT/DE90/00236
§ 371 Date: Nov. 16, 1990
§ 102(e) Date: Nov. 16, 1990

[87] PCT Pub. No.: WO90/12443
PCT Pub. Date: Oct. 18, 1990

[30] Foreign Application Priority Data
Apr. 1, 1989 [DE] Fed. Rep. of Germany ....... 4006387

[51] Int. Cl.$^5$ ................................................ H02J 7/24
[52] U.S. Cl. .............................. 322/25; 322/27; 322/28; 322/73
[58] Field of Search ................ 322/21, 28, 73, 25, 322/27

[56] References Cited
U.S. PATENT DOCUMENTS 4,486,702 12/1984 Edwards ............................. 322/28
4,555,657 11/1985 Kato et al. .
5,013,996 5/1991 Conzelmann et al. ............. 322/28

3,868,558 2/1975 Winkley et al. .

*Primary Examiner*—R. J. Hickey
*Attorney, Agent, or Firm*—Michael J. Striker

[57] ABSTRACT

A voltage regulator (4) for a generator (1), particularly for use in motor vehicles, is provided which produces an average field current in the exciting winding (2) of the generator (1) by switching on and off the field current by a controlled semiconductor switch in cooperation with a recovery diode in such a way that the generator voltage remains approximately constant independently of the load and the speed. The voltage regulator (4) contains an integrally acting component for compensating for load-dependent and speed-dependent errors, which component is produced by a nonlinearly working integrator for the relative turn-on period of the current through the exciting winding (2) and is fed back into the regulating circuit of the voltage regulator (4). The nonlinearly of the output variable of the integrator is produced in that, for the formation of the correction function, one period portion during the current flow through the exciting winding (2) of the generator (1) and the controlled semiconductor switch is evaluated differently than the other period portion during the current flow through the exciting winding (2) and the recovery diode.

10 Claims, 4 Drawing Sheets

VOLTAGE-REGULATOR FOR GENERATOR

The invention is directed to a voltage regulator for a generator.

Voltage regulators for three phase generators should, if possible, be usable for all generator sizes. This requires more extensive changes of their characteristic curves than was previously the case. Since digital regulator concepts which allow selection of desired regulator characteristic curves by "characteristic diagram regulation" are not only costly but also require at least a support capacitor, i.e. which must be directly connectable to the generator terminals, it is necessary to improve analog regulators by an integral component.

Regulators having an integral component for correcting their characteristic curves are superior to regulators which work in purely proportional manner U.S. Pat. No. 4,661,760 describes a regulator with an integral component which is produced by a measurement resistor in the load circuit. This is a very expensive solution due to the measurement resistor for high currents and the required conductors.

On the other hand, the solution described in U.S. Pat. No. 4,555,657 and in U.S. Pat. No. 4,590,414 makes due without the expensive measurement resistor by determining the relative turn-on period of the exciting current as a substitute variable present at the regulator itself Moreover, a regulator having a nonlinear integral component is known from WO 88/01110.

SUMMARY OF THE INVENTION

In contrast, the voltage regulator, according to the invention, with the characterizing features of the main claim has the advantage on the one hand that it is extremely simple with sufficient effect and on the other hand that deviations of the regulator characteristic line from the ideal curve with respect to speed and load can be corrected in a favorable manner by them with moderate expenditure on switching means—assuming a correct design.

There are various possibilities for showing the required correction functions K, i.e. currents and/or voltages which are to be coupled in at suitable places on the actual value side or reference side of the regulated system while taking into account their phase relation:

For example, a different evaluation of the exciting current during the current flow in the two partial periods for forming the correction function can be shown in that, by means of a circuit which is controllable synchronously relative to the cycle of the voltage regulator, the measurement resistor in the exciting circuit is allotted a resistance value during the current flow through the exciting field and the controlled semiconductor switch which is different than the resistance value during the current flow through the exciting field and the recovery diode, or advantageously in that the signal voltage tapped at the measurement resistor located in the exciting field for determining the field current is assigned a different output value during the current flow through the exciting field and the controlled semiconductor switch than during the current flow through the exciting field and the recovery diode by means of a circuit for dividing the voltage or current, which circuit is controllable synchronously with the cycle of the voltage regulator.

The measurement resistance in the exciting circuit is an extra component of the circuit. In monolithic integrated regulators, on the other hand, a measurement resistor can be used advantageously in the collector circuit of the controlled semiconductor switch and in the circuit of the recovery diode, in each instance, since already existing line sections such as the coating of metallization of a collector or emitter finger or of the anode or cathode finger of a cell are suitable for this purpose. The measurement resistors can have identical or different resistance values. The simplest solution provides for the connection of the low end of the reference voltage not to ground, but to the "hot" end of an emitter resistor, so that there results, as will be shown in the following, a correction function $y = ax^2$, i.e. an increase in the actual value chiefly in the area of large currents.

Of course, the suggested nonlinear correction function K can also be shown with a capacitor whose charging current is different from its discharging current with respect to the instantaneous value of its voltage.

BRIEF DESCRIPTION OF THE DRAWING

The objects, features and advantages of the present invention will now be illustrated in more detail by the following detailed description, reference being made to the accompanying drawing in which.

DETAILED DESCRIPTION OF THE INVENTION

Figure 1:
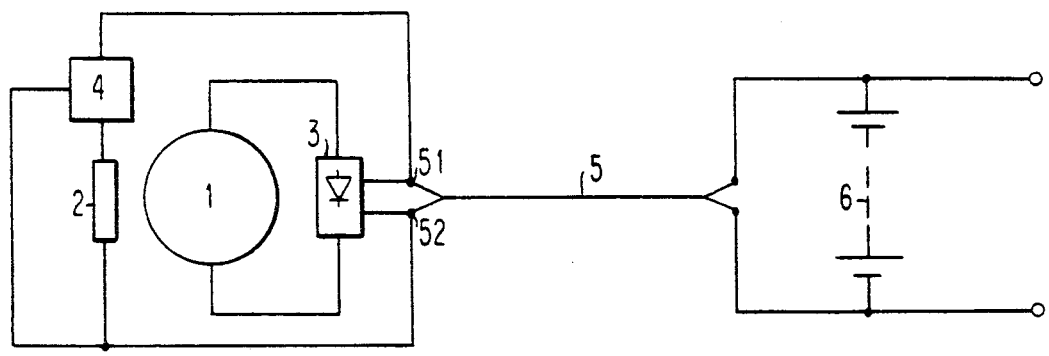
FIG. 1 shows the block, wiring diagram of a power supply comprising generator, rectifier, voltage regulator and battery.
Figure 2:
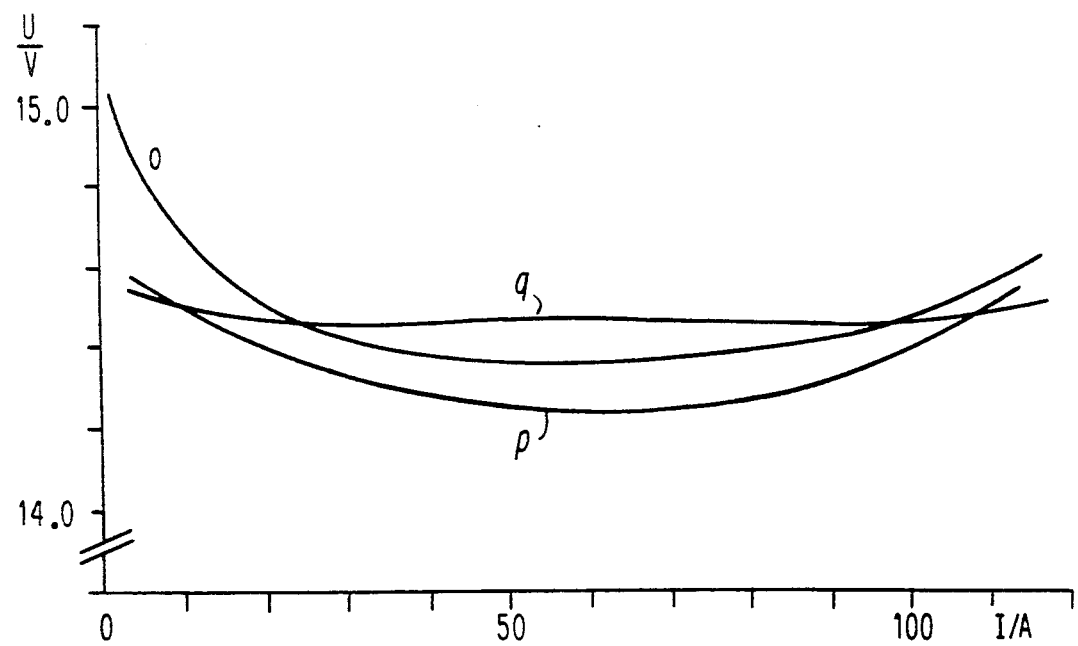
FIG. 2 shows the voltage curve as a function of the generator current of a generator which is operated with three different voltage regulators, specifically with one which comprises integral components which work only in a purely linear manner, one with a correction function K according to WO 88/01110, and another with a considerably improved correction function K, according to the invention.

In FIG. 1, the generator 1 is provided with exciting winding 2, rectifier 3 and voltage regulator 4 halts its positive terminal is designated by 51 and its negative terminal is designated by 52. The line 5 connects the generator 1 with the battery 6. The voltage regulator 4 is connected with the terminals 51, 52. The actual value of the generator voltage is accordingly tapped at the generator itself. In the illustration of the voltage curve as a function of the generator current for a generator with 120 A nominal current, FIG. 2, the characteristic curve of a voltage regulator with a purely linearly acting integral correction function is designated by o, the characteristic line of a simply nonlinear voltage regulator is designated by p, and the characteristic line of a voltage regulator with an expanded correction function according to the invention is designated by q.

With the linearly working correction function o, the actual value of the generator voltage drops by 700 mV from zero current to approximately half the generator current and then increases again by 300 mV up to the maximum value of the current. If the initial part of the linear correction function is cut out, i.e. passes to a nonlinear correction, a clear improvement results with voltage curve p. The actual value of the generator voltage now extends in an approximately symmetrical manner relative to the current. It deviates from the maximum values at the two end points by only approximately −300 mV. If this curve is to be improved, a correction function is required which is of a higher order than in q, where the maximum deviation is only approximately 80 mV absolute.

Figure 3:
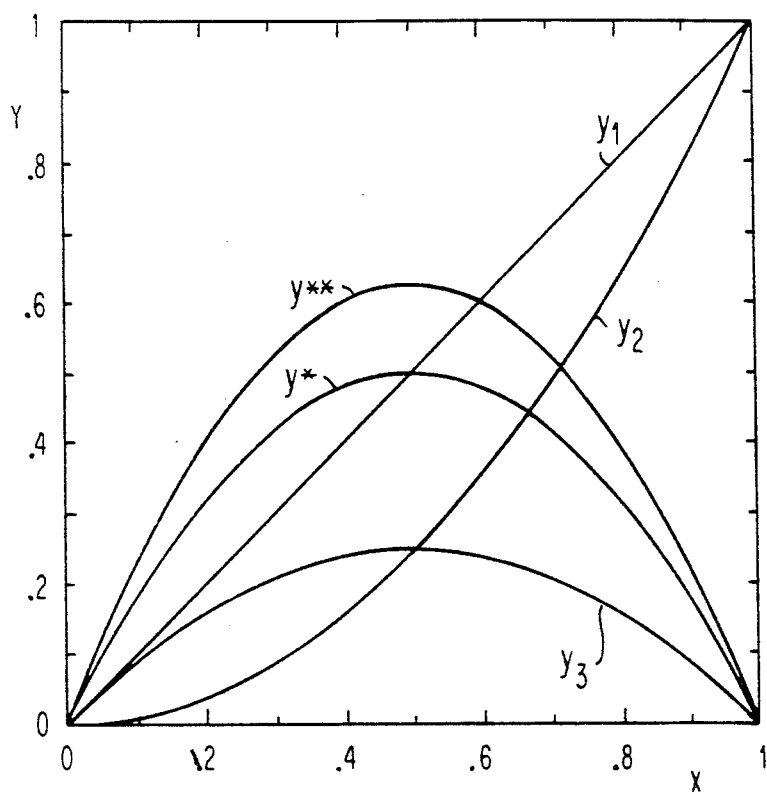
FIG. 3 shows possibilities provided by different evaluation of the two partial periods, according to the invention, from which the different correction functions K of FIG. 4 can be formed by way of example.
Figure 4:
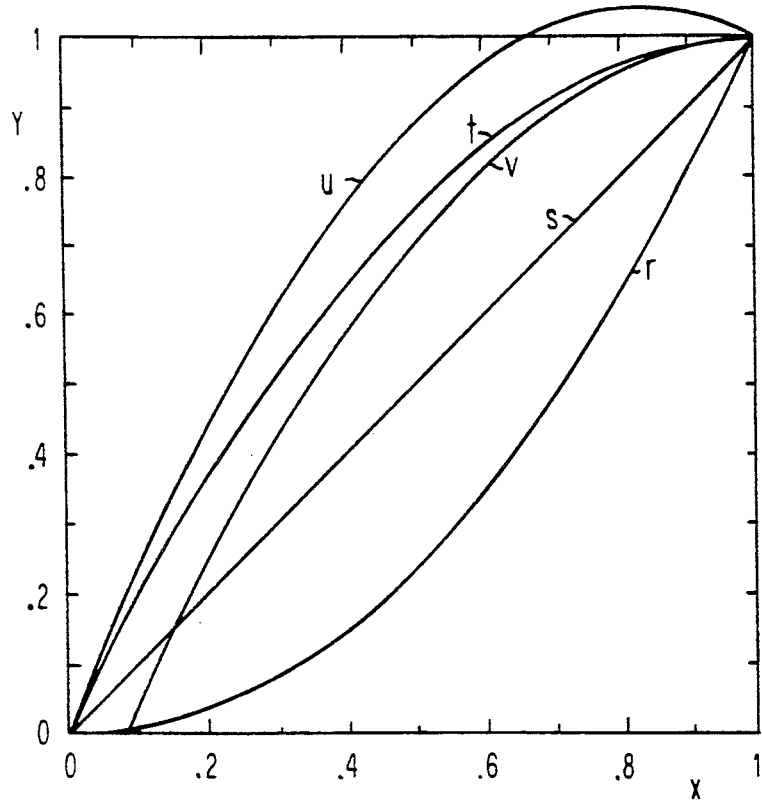

The illustration of such correction functions is explained with the aid of FIGS. 3 and 4. The abscissa x and ordinate y are provided with standardized scales. If $I_e$ is the actual value of the exciting current and $I_m$ is its maximum value with continuously turned on semiconductor switch of the voltage regulator, then:

$$x = I_e/I_m$$

is the relative turn-on period of the exciting current and y is the output variable of the corresponding circuit part by means of which it is obtained, the output variable being standardized to 1, in an OTA (operational transconductance amplifier), i.e. a current or, at a measurement resistor, a voltage. But x can also be obtained without a measurement resistor directly from the collector voltage of the semiconductor switch by an external integrator, e.g. an RC network.

With a measurement resistor in the exciting circuit, the curve y(x) is a straight line $y_1 = x$ (FIG. 3). If the measurement resistor is placed in the circuit of the semiconductor switch, then $y_2 = x^2$ is a parabola with horizontal tangents in the zero point. With a measurement resistor in the circuit of the recovery diode, the function $y_3 = x - x^2$ results, i.e. also a parabola with horizontal tangents in the maximum at $x = 0.5$. Adding the two functions $y_2$ and $y_3$ gives $y_4$, i.e.

$$y_4 = y_2 + y_3 = x^2 + (x - x^2) = x.$$

The correction function y = x, which supplies a measurement resistor in the exciting circuit, can accordingly also be obtained by two measurement resistors in the collector circuit of the semiconductor switch and in the anode circuit of the recovery diode when the two variables are added, e.g. by two operational amplifiers with the same turns ratio. A plurality of widely different functions $y_4(x)$ as correction function for the actual value of the generator voltage can be obtained easily by different turns ratios, e.g. $y_3 = a(x - x^2)$ with $a = 2.0$ as y* and y** with $a = 2.5$ in FIG. 3.

Some possibilities for this are shown in FIG. 4. Generally, with partial functions provided with proportionality factors and an additive constant, $$y_4 = a(x - x^2) + bx^2 + c.$$

With $a = 0$ and $b = 1$, $y_4 = x^2$ shown by r; s corresponds to y = x and the function $y_4 = 2(x - x^2) + x^2$ corresponds to the curve t; selecting $a = 2.5$ gives u, which is greater than 1. Adding the constant $c = -0.15$ for $a = 2$ gives v, which begins below zero. If, for example, the output of the utilized OTAs supplies no current $i < 0$, this branch is suppressed. Then u can likewise be cut off at $y_4 = 1$, if its maximum current is fixed at standardized "1".

Virtually any correction functions can be obtained easily by changing the constants a, b, and c and correspondingly determined control ranges of the utilized amplifiers. Thus, the voltage curve q of illustration 2 with a correction function K, e.g. with the constants $a = 2$, $b = 1$ and $c = 0.15$, corresponding to the curve v in FIG. 4, can be achieved. Improved corrections by means of further development of the correction function K using the described means have little significance, nor do aimed for additional corrections, e.g. by the temperature curve, insofar as the temperature curve of the voltage regulator is also in order, that is, corresponds to the predetermined temperature function.

Figure 5:
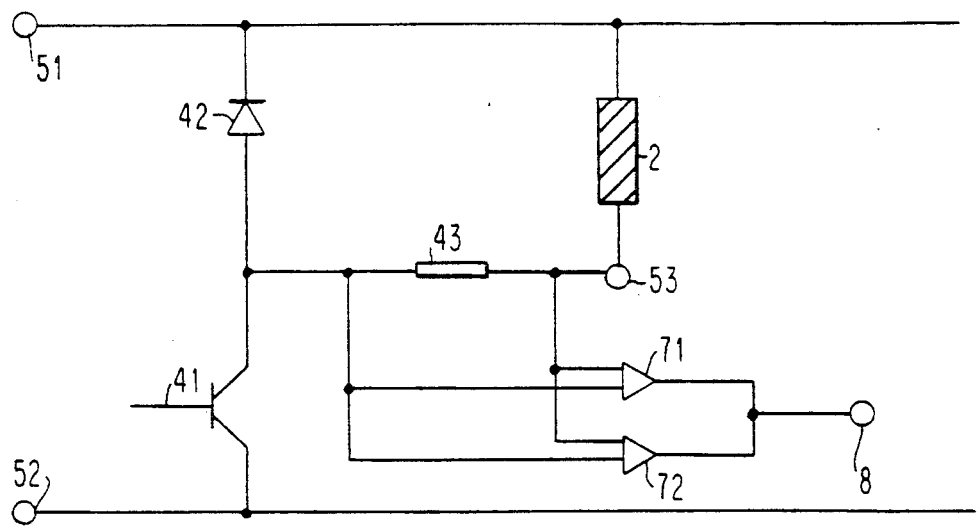
FIG. 5 shows the block wiring diagram for forming a correction function K, according to the invention, with a measurement resistor in the exciting circuit and two operational amplifiers with different current transformer ratios.
Figure 6:
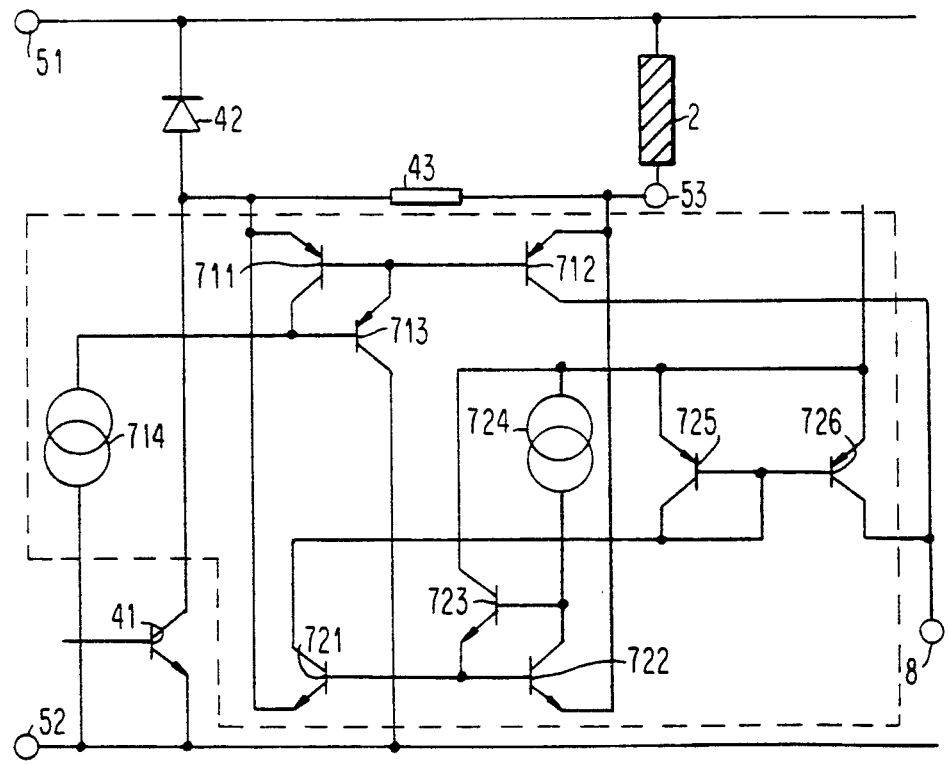
FIG. 6 shows a circuit for the latter by way of example.

In FIG. 5, the exciting field of the generator is again designated by 2. The semiconductor switch of the voltage regulator, an NPN transistor, is designated by 41, and its recovery diode is designated by 42. The measurement resistor in the exciting circuit for determining the exciting current corresponding to the integral value of the relative turn-on period is designated by 43. The two operational amplifiers 71 and 72 (OTA) are connected in parallel by their inputs at the measurement resistor 43, their outputs are likewise connected in parallel at the terminal 8 at which the correction function is taken off. Means for adjusting the operating points, the control areas and the constants a and c (b=1), which means are likewise required, are known to the person skilled in the art and are therefore omitted. With respect to the two amplifiers, e.g. the amplifier 71 should be active during the current flow through the recovery diode 42 and the amplifier 72 should be active during the current flow through the transistor 41. This requires a switching of the amplifier in the cycle of the frequency of the regulator. The operational amplifier 71 is formed by the PNP transistors 711, 712, 713 and the current source 714. In a corresponding manner, the NPN transistors 721, 722, 723, with the current source 724, form the operational amplifier 72, whose output current is again mirrored by the current mirror 725, 726 and then combined with the output current of the amplifier 71, the correction function K occurring at the terminal 8 is shown. The signal voltage dropping at the measurement resistor is coupled into the emitters of the differential transistors 711, 712 and 721, 722, respectively. If the exciting current flows through the recovery diode 42, the transistor is turned off. The potential of the connection terminal 53 of the field winding is high, the operational amplifier 71 receives operating voltage and works in the partial period intended for it. The transistors of the operational amplifier 72 are blocked during this time.

If the exciting current flows through the transistor after the latter is switched on, its collector-emitter potential is small and the potential of the connection terminal 53 is accordingly also low. The transistors 721, 722, . . . now receive operating voltage, the operational amplifier 72 works.

Figure 7:
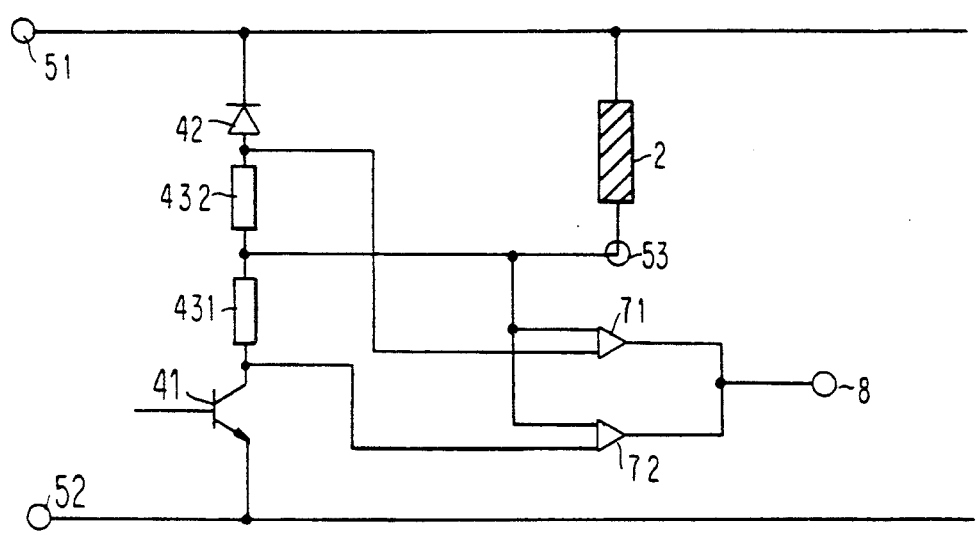
FIG. 7 shows an arrangement which again comprises a measurement resistor in the collector circuit of the transistor and in the anode circuit of the recovery diode.

FIG. 7 shows how the block wiring diagram looks with two measurement resistors 431, 432 in the exciting circuit of the recovery diode 42 and of the transistor 41, in each instance, instead of the shared measurement resistor 43. This solution is particularly advantageous if the resistors can be constructed by line sections already present in the layout, as was already described. In this case, their resistance values are possibly different, so that their resistance ratio for the desired transformer ratio of the two operational amplifiers (n) is to be taken into account.

The invention allows the curve of the actual value of the generator voltage as a function of the generator current, above all in built-in regulators with a voltage inquiry at the generator terminals, to be leveled in a particularly simple manner in monolithic integrated voltage regulators by means of corrections of a higher order. As was shown, the residual error can also be lowered to values under 100 mV in high-current generators.

While the invention has been illustrated and described as embodied in a voltage regulator for a generator, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. Voltage regulator for a generator having a load and an exciting winding, consisting essentially of a first transistor having a base, an emitter and a collector acting as a controlled semiconductor switch; a recovery diode connected electrically in parallel with said exciting winding, in series with said first transistor and to the collector of said first transistor; a nonlinear integrator of a relative turn-on period of a current through the exciting winding connected electrically with said first transistor for control of said first transistor, wherein said nonlinear integrator comprises the exciting winding, a first measurement resistor connected in series with said recovery diode and said first transistor and also in series with said exciting winding and said first transistor, said first measurement resistor being connected to one of said collector and said emitter of said first transistor; a second measurement resistor connected electrically in series with the recovery diode and in parallel with said exciting winding so that said resistors are connected in series with each other and form a voltage divider, a first operational amplifier having at least two operational amplifier inputs and an output, said first measurement resistor being connected across the inputs of the first operational amplifier, a second operational amplifier also having two inputs and an output, said second measurement resistor being connected across the inputs of the second operational amplifier, said outputs of said operational amplifiers being connected in parallel; means for adjusting said operational amplifiers so as to produce an output variable containing a predetermined correction function, and means for connecting said outputs of said operational amplifiers to said first transistor and for controlling said first transistor, so that a resistance experienced by the current flowing through the exciting winding and the semiconductor switch is different from that experienced by the current flowing through the exciting winding and the recovery diode so as to maintain a generator voltage of said generator constant independently of load and speed.

2. Voltage regulator according to claim 1, wherein said measurement resistor is connected to the emitter of said first transistor.

3. Voltage regulator according to claim 1, wherein said measurement resistor is connected to the collector of said first transistor.

4. Voltage regulator according to claim 3, wherein said first operational amplifier consists essentially of a current source and three PNP transistors connected electrically with each other.

5. Voltage regulator according to claim 4, wherein said second operational amplifier consists essentially of another current source and three NPN transistors connected electrically with each other.

6. Voltage regulator for a generator according to claim 1, wherein said means for adjusting said operational amplifiers so as to produce the output variable containing the predetermined correction function is adjusted so that the correction function increases more steeply when current flows through the exciting field and the recovery diode by a factor between 1 and 2.5 than when current flows through the exciting field and the first transistor.

7. Voltage regulator for a generator having a load and an exciting winding, consisting essentially of a first transistor having a base, an emitter and a collector acting as a controlled semiconductor switch; a recovery diode connected electrically in parallel with said exciting winding and in series with said first transistor to the collector of said first transistor; a nonlinear integrator of a relative turn-on period of a current through the exciting winding connected electrically with said first transistor for control of said first transistor, wherein said nonlinear integrator consists essentially of the exciting winding, a measurement resistor connected in series with said exciting winding and said first transistor and also in parallel with said recovery diode, said measurement resistor being connected between said collector of said first transistor and said exciting winding; circuit means connected with said measurement resistor for producing one output variable when the current flows through the exciting winding and the first transistor and another different output variable when the current flows through the recovery diode and the exciting winding, said means being synchronized with a cycle of the voltage regulator, and means for controlling said first transistor with said output variable and means for adjusting said circuit means to produce said output variable with a predetermined correction function according to said circuit means so as to maintain a generator voltage of said generator constant independently of load and speed.

8. The voltage regulator according to claim 7, wherein said circuit means consists essentially of a first operational amplifier having at least two operational amplifier inputs and an output, said measurement resistor being connected across the inputs of the first operational amplifier, a second operational amplifier also having two inputs and an output, said measurement resistor being connected across the inputs of the second operational amplifier, said outputs of said operational amplifiers being connected in parallel; means for adjusting said operational amplifiers separately and differently so as to produce an output variable containing a predetermined correction function, and means for connecting said outputs of said operational amplifiers to said first transistor and for controlling said first transistor.

9. Voltage regulator according to claim 8, wherein said first operational amplifier consists essentially of a current source and three PNP transistors connected electrically with each other.

10. Voltage regulator according to claim 9, wherein said second operational amplifier consists essentially of another current source and three NPN transistors connected electrically with each other.

* * * * *